United States Patent [19]
Lee et al.

[11] Patent Number: 5,882,123
[45] Date of Patent: Mar. 16, 1999

[54] ROLL-FORMED BEARING RACE AND PROCESS FOR PRODUCING THE SAME

[75] Inventors: Peter W. Lee; Martin D. Pierce; Goverdhan D. Lahoti, all of Stark County, Ohio

[73] Assignee: The Timken Company, Canton, Ohio

[21] Appl. No.: 868,457

[22] Filed: Jun. 3, 1997

[51] Int. Cl.$^6$ .......................... F16C 33/64; B21D 17/04; B21H 1/06
[52] U.S. Cl. ...................... 384/569; 72/106; 29/898.066; 384/512; 384/559; 384/571
[58] Field of Search .................... 384/559, 564, 384/569, 571, 504, 505, 506, 512; 72/91, 105, 106; 29/898.066

[56] References Cited

U.S. PATENT DOCUMENTS

| | | | |
|---|---|---|---|
| 1,395,607 | 11/1921 | Sorensen | 384/492 |
| 1,904,734 | 4/1933 | Schlaa | 72/91 |
| 3,434,322 | 3/1969 | Cowles et al. | 72/107 |
| 3,446,048 | 5/1969 | Marcovitch | 72/126 |
| 3,469,427 | 9/1969 | Rollins | 72/91 |
| 3,528,271 | 9/1970 | Di Ponio | 72/108 |
| 3,681,962 | 8/1972 | Marcovitch | 72/87 |
| 4,522,515 | 6/1985 | Miki et al. | 384/571 |
| 5,261,159 | 11/1993 | Yasuda et al. | 29/898.066 |
| 5,639,167 | 6/1997 | Hans et al. | 384/512 X |

FOREIGN PATENT DOCUMENTS

| | | |
|---|---|---|
| 1090969 | 11/1967 | United Kingdom . |
| 1096468 | 12/1967 | United Kingdom . |
| 1099188 | 1/1968 | United Kingdom . |
| 1124802 | 8/1968 | United Kingdom . |
| 1137838 | 12/1968 | United Kingdom . |

*Primary Examiner*—Thomas R. Hannon
*Attorney, Agent, or Firm*—Polster, Lieder, Woodruff & Lucchesi, L.C.

[57] ABSTRACT

A double cup for a tapered roller being has a concave intervening surface between the small diameter ends of its tapered raceways. The cup is produced by roll forming a tubular blank at ambient temperature into a ring form having the raceways and the concave intervening surface. The presence of the concave intervening surface leaves only a shallow discontinuity in the exterior surface of the ring form, and that discontinuity is machined away with the removal of only a minimal amount of stock. The cup weighs less than cups with straight intervening surfaces.

22 Claims, 3 Drawing Sheets

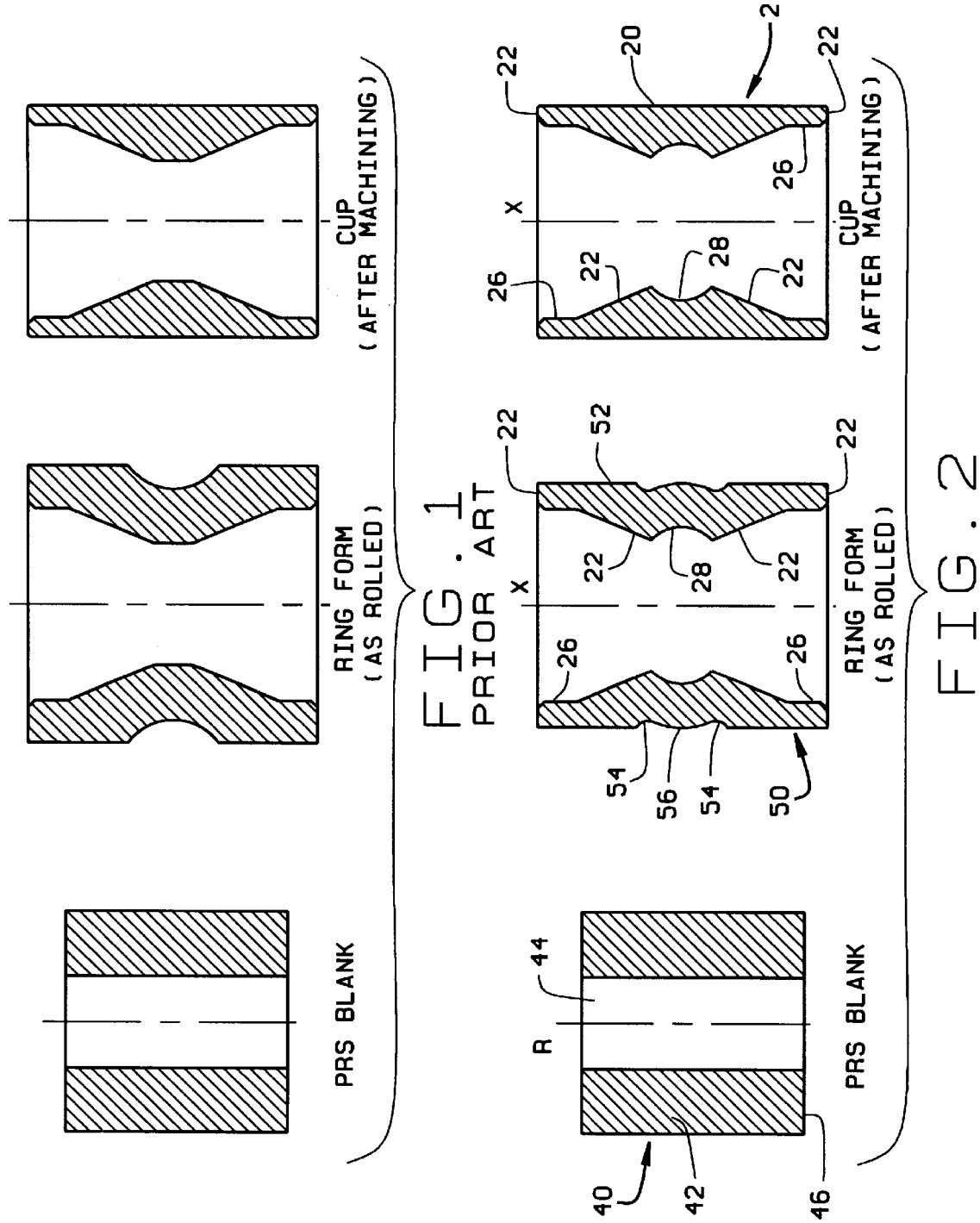

5,882,123

ROLL-FORMED BEARING RACE AND PROCESS FOR PRODUCING THE SAME

CROSS-REFERENCE TO RELATED APPLICATIONS

STATEMENT REGARDING FEDERALLY SPONSORED RESEARCH OR DEVELOPMENT

Not Applicable.

BACKGROUND OF THE INVENTION

This invention relates to roll forming metal and more particularly to a process for forming a multirow bearing race by roll forming and to a race and bearing formed thereby.

An antifriction bearing widely used in transportation equipment and elsewhere has a unitary outer race, two inner races, and tapered rollers arranged in two rows between the outer race and the two inner races, there being a separate row around each inner race. The unitary outer race, more commonly referred to as a double cup, has a pair of tapered raceways which are presented inwardly and taper downwardly to a cylindrical intervening surface or small inside diameter (SID), while the inner races or cones each have tapered raceways that are presented outwardly. Typically, the double cups are machined from tubing or forged rings, but owing to the taper of the raceways, the machining removes a considerable amount of metal. This makes the manufacture of double cups time-consuming and expensive.

To a lesser extent double cups are formed in a cold rolling operation, but this also requires a considerable amount of machining and stock removal. In this regard, the rollforming begins with a cylindrical blank of plain rectangular section (PRS blank—FIG. 1). The roll forming produces a ring form having tapered raceways and the cylindrical intervening surface between those raceways. But to acquire the raceways and the intervening surface, the metal of the blank must be displaced outwardly beyond the ends of that surface, and this leaves the exterior surface of the ring form with a groove located immediately outwardly from cylindrical intervening surface. The groove in turn renders the ring form difficult to guide during subsequent grinding. As a consequence, the ring form is machined on its exterior to remove an amount of metal sufficient to eliminate the groove. This results in almost as much stock removal as does machining from a tube or forged ring.

BRIEF SUMMARY OF THE INVENTION

The present invention resides in a process that produces a unitary outer race having two angular raceways and an intervening surface between the two raceways, with the intervening surface being depressed between the ends of the two raceways. The process includes subjecting a tubular blank to cold rolling that produces a ring form having the raceways and the depressed intervening surface. Without the depressed intervening surface between the raceways, the exterior surface of the ring form would have a deep groove opening out of it immediately outwardly from the intervening surface, but the depressed character of the intervening surface leaves the exterior surface of the ring form without any major discontinuities. The invention also resides in the race formed by the process and a double row bearing that includes the race. The invention also consists in the parts and in the arrangements and combinations of parts hereinafter described and claimed.

BRIEF DESCRIPTION OF THE SEVERAL VIEWS OF THE DRAWINGS

In the accompanying drawings which form part of the specification and wherein like numerals and letters refer to like parts wherever they occur:

FIG. 1 is a sequential view showing the conversion of a tubular blank into a double cup in a conventional roll forming process;

FIG. 2 is a sequential view showing the conversion of a tubular blank into a double cup in the process of the present invention;

Corresponding reference numerals will be used throughout the several figures of the drawings.

DETAILED DESCRIPTION OF THE INVENTION

Figure 3:
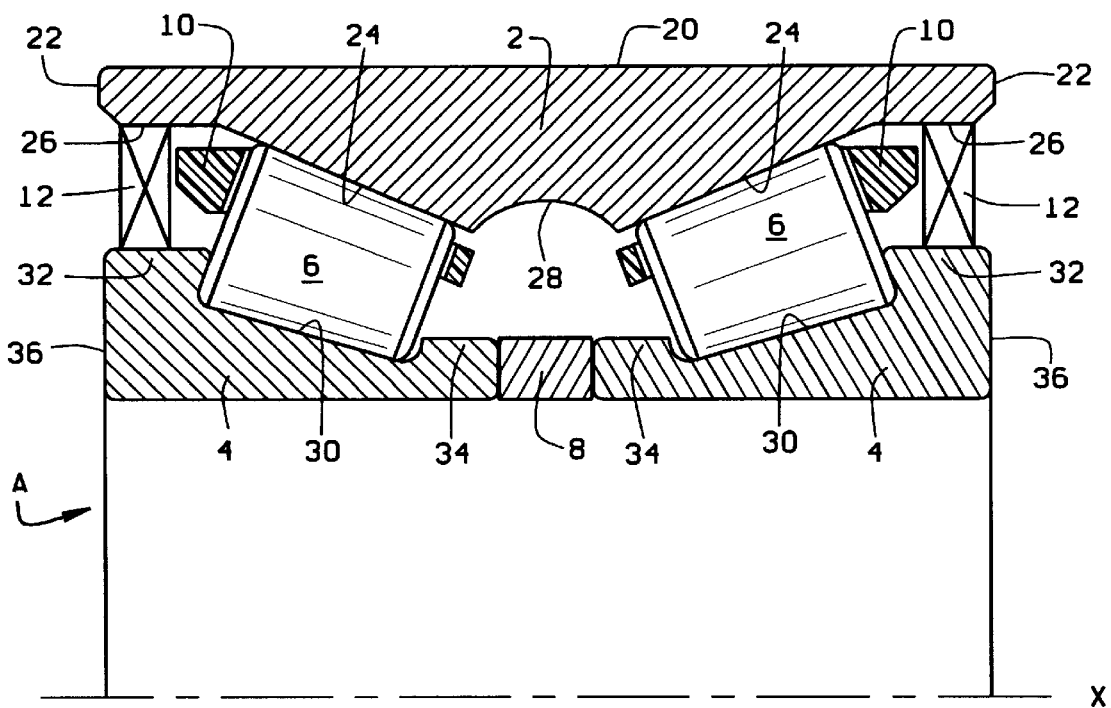
FIG. 3 is a sectional view of a double row bearing that includes a cup formed in accordance with the process of the present invention.

Referring now to the drawings, a double row antifriction bearing A (FIG. 3), which facilitates rotation about an axis X, includes a unitary outer race in the form of a double cup 2, a pair of inner races in the form of cones 4 located within the cup 2, and tapered rollers 6 arranged in two rows between the cones 4 and the cup 2, there being a row of rollers 6 around each cone 4. The two cones 4 are separated by a spacer 8, the length of which establishes the setting for the bearing A. In addition, the bearing A has a cage 10 around each cone 4 for maintaining the correct spacing between the rollers 6 of that cone 4 and seals 12 fitted into the ends of the cup 2 and around the cones 4 for establishing fluid barriers between the cup 2 and the cones 4 at the ends of the bearing A. The essence of the present invention resides in the cup and the process by which it is manufactured. The cones 4, rollers 6, spacer 8, cages 10 and seals 12 are conventional.

In its final form the cup 2 has (FIG. 3) a cylindrical exterior surface 20 that extends without interruption between two end faces 22, each of which is squared off with respect to the axis X. Internally, the cup 2 has another surface that extends between the end faces 22. It includes tapered raceways 24 which at their large diameter ends merge with short counterbores 26 that lead out to the end faces 22. The raceways 24 taper downwardly to an intervening surface 28, often referred to as a small inside diameter or simply SID. In contrast to conventional double cups, where the intervening surface is straight and cylindrical, the intervening surface 28 for the cup 2 is concave. The arrangement is such that the intervening surface 28 has its least diameter where it merges with the small diameter ends of the raceways 24 and has its greatest diameter midway between the small diameter ends of the raceways 24. As such the surface 28 is depressed and produces a groove that opens toward the axis X.

Each cone 4 has (FIG. 3) a tapered raceway 30 that is presented outwardly away from the axis X and toward one of the raceways 24 of the cup 2. In addition, each cone 4 has a thrust rib 32 at the large diameter end of its raceway 30 and a retaining rib 34 at the small diameter end. The thrust rib 32 ends at a back face 36 which is squared off with respect to the axis X and exposed at the end of the bearing A. The rollers 6 lie between the opposed raceways 24 and 30 of the cup 2 and cones 4, respectively, and indeed they contact the raceways 24 and 30 along their tapered side faces. The large diameter end faces of the rollers 6 abut the thrust rib 32 of the cones 4 which prevent the rollers 6 from being expelled from the annular space between the raceways 24 and 30. The geometry is such that the rollers 6 of the two rows are on apex, that is to say, the conical envelopes formed by the side faces of the tapered rollers 6 of either row will have their apices at a common point along the axis X and the conical envelopes for the raceways 24 and 30 of that row also have their apices at essentially the same location.

The spacer 8 fits between the two cones 4 to separate them and thus establishes the setting for the bearing A. The cages 10 retain the rollers 6 around the cone 4 when the cones 4 are withdrawn from the cup 2 and further maintain the correct spacing between the rollers 6. The seals 12 fit into the counterbores 26 of the cup 2 and around the thrust ribs 32 of the two cones 4 to create dynamic fluid barriers at the ends of the bearing A - barriers which retain a lubricant in the annular space between the cup 2 and cones 4 and exclude contaminants from that space. Typically, the lubricant is grease.

Figure 4:
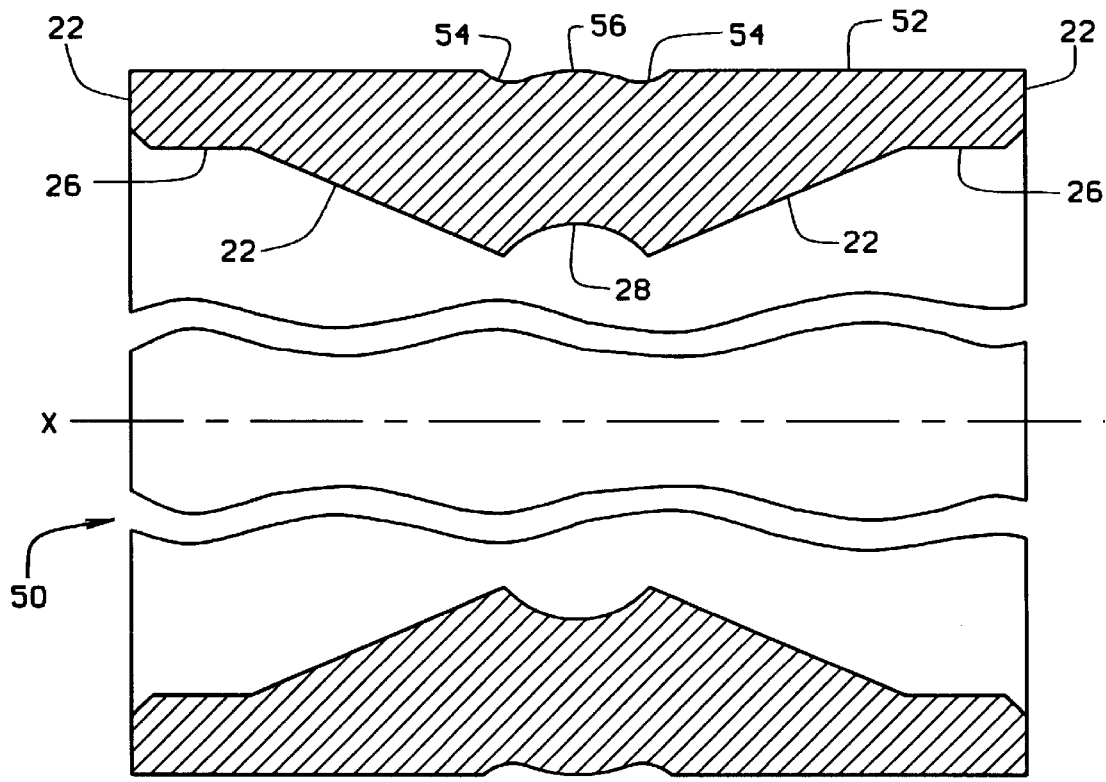
FIG. 4 is an enlarged fragmentary sectional view of a ring form produced in accordance with the process of the present invention.

The cup 2 derives from a short tubular blank 40 (FIG. 2) of plain rectangular section (PRS). As such the PRS blank 40 has a cylindrical outer surface 42 and a bore 44 which is concentric to the outer surface 42 about the axis R of the blank 40. The cylindrical surface 42 and the bore 44 as well extend between end surfaces 46 which are squared off with respect to the axis X. The PRS blank 40 is formed from a metal that is suitable for use in races for bearings, yet is ductile enough to be worked at ambient temperature. Low alloy steel meets these requirements The PRS blank 40 is converted by roll-forming into a ring form 50 (FIGS. 2 and 4) having the same general configuration of the cup 2 which it ultimately becomes. Thus, the ring form 50 has end faces 22, tapered raceways 24, end counter 26 and a concave intervening surface 28 that are essentially the same as their counterparts in the completed cup 2, except for the presence of more metal which is ultimately machined away. The ring form 50 also has a generally cylindrical exterior surface 52 having a pair of shallow grooves 54 that lie directly outwardly from the small diameter ends of the raceways 24 and a slightly convex surface 56 that lies directly outwardly from the concave intervening surface 28. Ultimately, the ring form 50 is machined along its cylindrical exterior surface 52 with enough metal being removed to eliminate the shallow grooves 54 and the convex surface 56. This machining produces the cylindrical exterior surface 20 for the cup 2.

The roll forming occurs in machine B (FIG. 5) which includes a mandrel 60 that is small enough to fit through bore 44 in the PRS blank 40. On its exterior surface the mandrel 60 has a forming region 62 which in cross-section conforms to the interior surface of the ring form 50, and well it should, for the interior surface of the ring form 50 is derived from the forming region 62 of the mandrel 60. Thus, the forming region 62 includes surfaces which match the tapered raceways 24, the concave intervening surface 28, and the surfaces of the counterbores 26. Where the ring form 50 has its concave intervening surface 28, the forming region 62 of the mandrel 50 has a convex surface.

Beyond both ends of its forming region, the mandrel 60 has cylindrical surfaces 64, and beyond the cylindrical surfaces 64 it is supported in bearings which enable the mandrel 60 to rotate about an axis M.

In addition, the roll forming machine B has a forming roll 70 which rotates about an axis N that lies parallel to the axis M for the mandrel 60, although the spacing between the axes M and N varies. In this regard, the forming roll 70 has the capacity to move toward and withdraw from mandrel 60, with the former being accompanied by considerable force, when necessary. The forming roll 70 has a cylindrical exterior surface 72 that lies directly opposite the forming region 62 on the mandrel 60, and that surface has its center at the axis N. The cylindrical surface 72 lies between two peripheral ribs 74 having inside faces 76 that are squared off with respect to the axis N. The spacing between the inside faces 76 of the rib 74 equals the length of the completed ring form 50, that is, the distance between its end faces 22.

On the opposite side of the mandrel 60 two receiving rolls 80 having cylindrical exterior surfaces 82 revolve about a common axis O that likewise lies parallel to the axis M of the mandrel 60. The receiving rolls 80 are spaced far enough apart to accommodate the completed ring form 50 between them and have their cylindrical peripheral surfaces 82 against the cylindrical surfaces 64 on the mandrel 60. The receiving rolls 80 serve to back the mandrel 60 and prevent it from deflecting under the heavy force exerted on it by the forming roll 70. Actually, that force is not transmitted directly from the forming roll 70 to the mandrel 60, but instead indirectly through the PRS blank 40.

Finally, the forming machine B includes a size sensor 86 which lies between the two receiving rolls 80 where it is located opposite the forming region 62 of the mandrel 60. The sensor 86 deflects in the presence of the ring form 50 on the mandrel 60 and is connected to electrical circuitry which produces a signal that reflects the magnitude of the deflection. As such, it monitors the diameter of the cylindrical surface 52 on the ring form 50.

Figure 5:
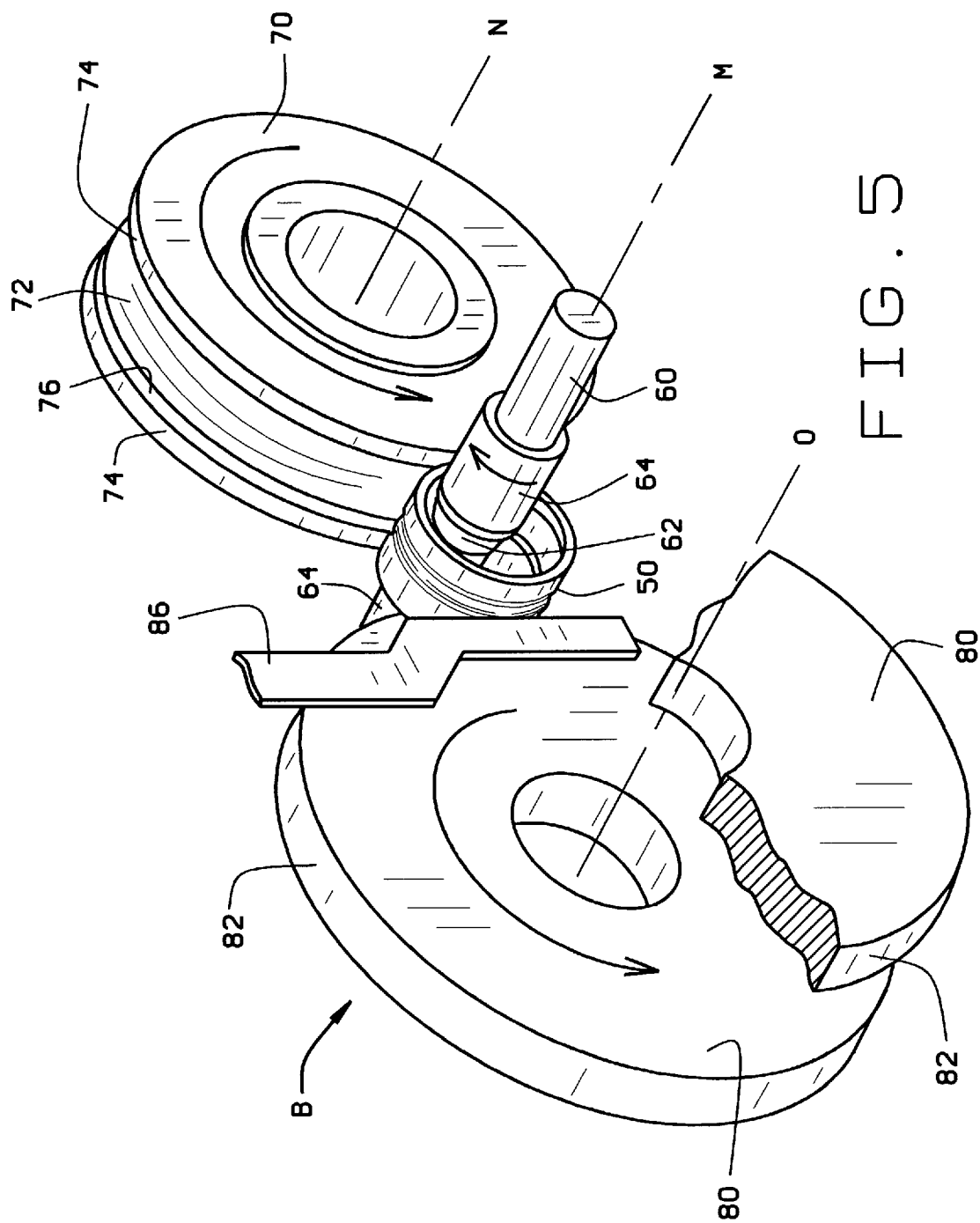
FIG. 5 is a schematic perspective view, partially broken away and in section, of a roll forming machine used to practice the process of the present invention.

To convert the PRS blank 40 into the ring form 50, the blank 40 is placed over the mandrel 60 of the forming machine B such that it is generally centered with respect to the forming region 62 of the mandrel 60 (FIG. 5). Then, with the forming roll 70 retracted, the cylindrical surfaces 82 of the receiving rolls 80 are brought against the cylindrical surfaces 64 that lie beyond the forming region 62 on the mandrel 60, so that the receiving rolls 80 form a backing for the mandrel 60. The blank 40 lies between the two receiving rolls 80.

With the PRS blank 40 located around the forming region 62 of the mandrel 60, rotation is imparted to the forming roll 70, the receiving rolls 90, and the mandrel 60, and the forming roll 70 is advanced toward the mandrel 60. The advance brings the cylindrical surface 72 of the forming roll 70 against the cylindrical exterior surface 52 of the PRS blank 40, compressing the blank 40 between the forming roll 70 and the mandrel 60.

The PRS blank 40 deforms in the presence of the force applied by the forming roll 70. Owing to the rotation, the deformation is gradual and could be characterized as a flow of the metal into the cavity represented by the forming region 62 of the mandrel 60. Indeed, the straight bore 44 of the blank 40 transforms into a configuration that in cross-section matches the cross-sectional configuration of the forming region 62. Hence, it has the tapered raceways 24, the concave intervening surface 28, and the counterbores 26. As the blank 40 deforms against the forming region 62 of the mandrel 60, it grows in length, but is eventually confined by the ribs 74 on the forming roll 70. Indeed, the inside faces 76 on the ribs 74 insure that the ends of the blank 40—or the ring form 50 derived from it—remain squared off with respect to the axis X and produce the end faces 22 on the ring form 50. Apart from increasing the length of the blank 40, the working between the forming roll 70 and mandrel 60 also increases the diameter of the blank 40, so that the ring form 50 which is derived from the blank 40 possess a diameter somewhat greater than the diameter of the original blank 40. The sensor 86 monitors the growth in diameter and indicates when the ring form 50 reaches the proper size. The deformation occurs at ambient temperature and thus can be characterized as cold working or cold rolling.

The ring form 50 which is so formed (FIG. 4) possesses the general configuration of the cup 2 for the bearing A, but its raceways 24 do not fall within the tolerances required and its exterior surface 52 possesses the shallow grooves 54 and the convex surface 56 between them. These discontinuities in the otherwise cylindrical exterior surface 52, if they remained, would render the ring form 50 difficult to control in grinding machines.

Once the sensor 86 signals that the ring form 50 has reached the proper diameter, the forming roll 70 is retracted and the ring form 50 is removed from the mandrel 60. Thereafter, the ring form 50 is machined along its raceways 24, counterbores 26 and end faces 22. It is also machined along its generally cylindrical exterior surface 52 to provide the continuous and truly cylindrical surface 20 of the cup 2. Since the grooves 54 are shallow, the machining at the exterior surface 52 removes relatively little stock. Certainly, it removes far less metal than required in connection with a conventionally roll-formed cup having a straight intervening surface between its raceways.

After the machining that brings the ring form 50 close to the dimensions required for the cup 2, the ring form 50 is case-carburized and subjected to the heat treatments required to impart the desired hardness to its surfaces, particularly its raceways 24. Then it is ground along its raceways 24 cylindrical surface 20 to provide them with the desired finish and to bring them within dimensional tolerances.

The process for producing the cup 2 requires relatively little machining, and the machining that is required removes minimal amounts of stock. This represents a saving in manufacturing time and material. Also, the cup 2, owing to the concave intervening surface 28 between its raceways 24, weighs less than conventional cups having straight intervening surfaces—indeed, 8 to 10 percent less. Yet, the lesser weight does not detract from the strength or durability of the cup 2 or its performance. The internal groove formed by the concave intervening surface 28 in the cup 2 enables the bearing A to hold more lubricant than conventional bearings with straight or cylindrical intervening surfaces in their cups, and this is particularly advantageous where the bearing A is sealed for life.

This invention is intended to cover all changes and modifications of the example of the invention herein chosen for purposes of the disclosure which do not constitute departures from the spirit and scope of the invention.

We claim:

1. A process for producing a race for an antifriction bearing; said process comprising: subjecting a blank that is tubular about an axis to roll forming that converts the blank into a ring form having ends and first and second axially directed surfaces extended between the ends, the first surface being generally straight, the second surface including two angular raceways and an intervening surface located between the angular raceways, the angular raceways being spaced farthest from the first surface in the region of the intervening surface and the intervening surface being depressed toward the first surface, whereby the first surface contains minimal discontinuities in the region thereof that lies behind the intervening surface.

2. The process according to claim 1 wherein the angular raceways are substantially conical.

3. The process according to claim 1 wherein the first surface has shallow grooves located behind those ends of the raceways that are closest to the intervening surface.

4. The process according to claim 3 and further comprising machining the ring form at its first surface to eliminate the discontinuities created by the shallow grooves.

5. The process according to claim 4 and further comprising machining the ring form at the raceways.

6. The process according to claim 5 and further comprising subjecting the ring form, after it is machined, to a heat treatment to harden it along the raceways, and thereafter grinding the raceways.

7. The process according to claim 1 wherein the step of roll forming the blank includes compressing the blank between a mandrel and a forming roll, one of which has a surface that in cross-section conforms to the raceways and intervening surface imparted to the blank to create the ring form.

8. The process according to claim 1 wherein the first surface is presented away from the axis and the second surface is presented toward the axis.

9. The process according to claim 8 wherein the outside surface of the blank is substantially cylindrical; wherein the roll-forming leaves the outside surface of the ring form substantially cylindrical; and wherein, as a consequence of the roll-forming, the inside surface of the ring form has a substantially different configuration than the inside surface of the blank.

10. The process according to claim 8 wherein the roll-forming displaces metal from the inside surface toward the outside surface so that in the ring form the outside surface contains minimal discontinuities.

11. A process for producing a unitary double cup for a tapered roller bearing, said process comprising: placing a metal blank that is tubular over a mandrel having a forming region; compressing the blank between the mandrel and a forming roll while the mandrel and forming roll rotate, all to roll-form the blank into a ring form having two raceways that are spaced axially apart and an intervening surface between the raceways, the raceways having their smallest diameters along the intervening surface and the intervening surface being depressed outwardly beyond the ends of the raceways to avert a substantial deformation along the outwardly presented surface of the ring form.

12. The process according to claim 11 and further comprising machining the ring form along its outwardly presented surface to remove discontinuities from the ring form at that surface, and machining the ring form along its raceways.

13. The process according to claim 12 wherein the surface of the forming roll that is presented toward the mandrel is substantially cylindrical.

14. The process according to claim 11 wherein the blank has a generally cylindrical exterior surface and a generally cylindrical bore that are concentric.

15. The process according to claim 11 wherein the roll forming leaves the ring form with shallow grooves that open out of its outwardly presented surface behind the small ends of the raceways, and wherein the machining substantially removes the shallow grooves.

16. The process according to claim 12 and further comprising heat treating the ring form after machining to increase the hardness of the raceways and grinding the raceways.

17. A unitary bearing race having ends and first and second axially directed surfaces extended between the ends, the first surface being generally straight and substantially without discontinuities, the second surface having angular raceways and an intervening surface between the raceways, the angular raceways being spaced farthest from the first surface where they are next to the intervening surface, the intervening surface being arcuate in cross-section and depressed toward the first surface so that it generally lies closer to the first surface than those ends of the raceways that are closest to the intervening surface.

18. A bearing race according to claim 15 wherein the raceways are conical.

19. A bearing race according to claim 8 wherein the second surface is presented toward the axis and the first surface away from the axis.

20. A bearing race according to claim 17 that is roll-formed form a tubular metal blank.

21. An antifriction bearing for facilitating rotation about an axis, said bearing comprising: an inner race having a pair of raceways presented outwardly away from the axis; an outer race having a pair of angular raceways presented inwardly toward the axis and surrounding the raceways of the inner race; rolling elements organized in two rows between the raceways of the inner and outer races; one of the races being roll-formed from a tubular metal blank and having ends and first and second axially directed surfaces extended between the ends, the first surface being generally straight and substantially without discontinuities, the second surface having the raceways of the race and an intervening surface between the raceways, the raceways for the roll-formed race being at an angle to the axis and spaced farthest from the first surface where they are next to the intervening surface, the intervening surface being arcuate in cross-section and depressed toward the first surface so that it generally lies closer to the first surface than those ends of the raceways that are closest to the intervening surface.

22. An antifriction bearing according to claim 21 wherein the roll-formed race with the arcuate intervening surface is the outer race.

* * * * *